H. R. STRAIGHT.
MACHINE FOR CORRUGATING PLASTIC BLOCKS.
APPLICATION FILED JUNE 17, 1919.
1,411,533.
Patented Apr. 4, 1922.
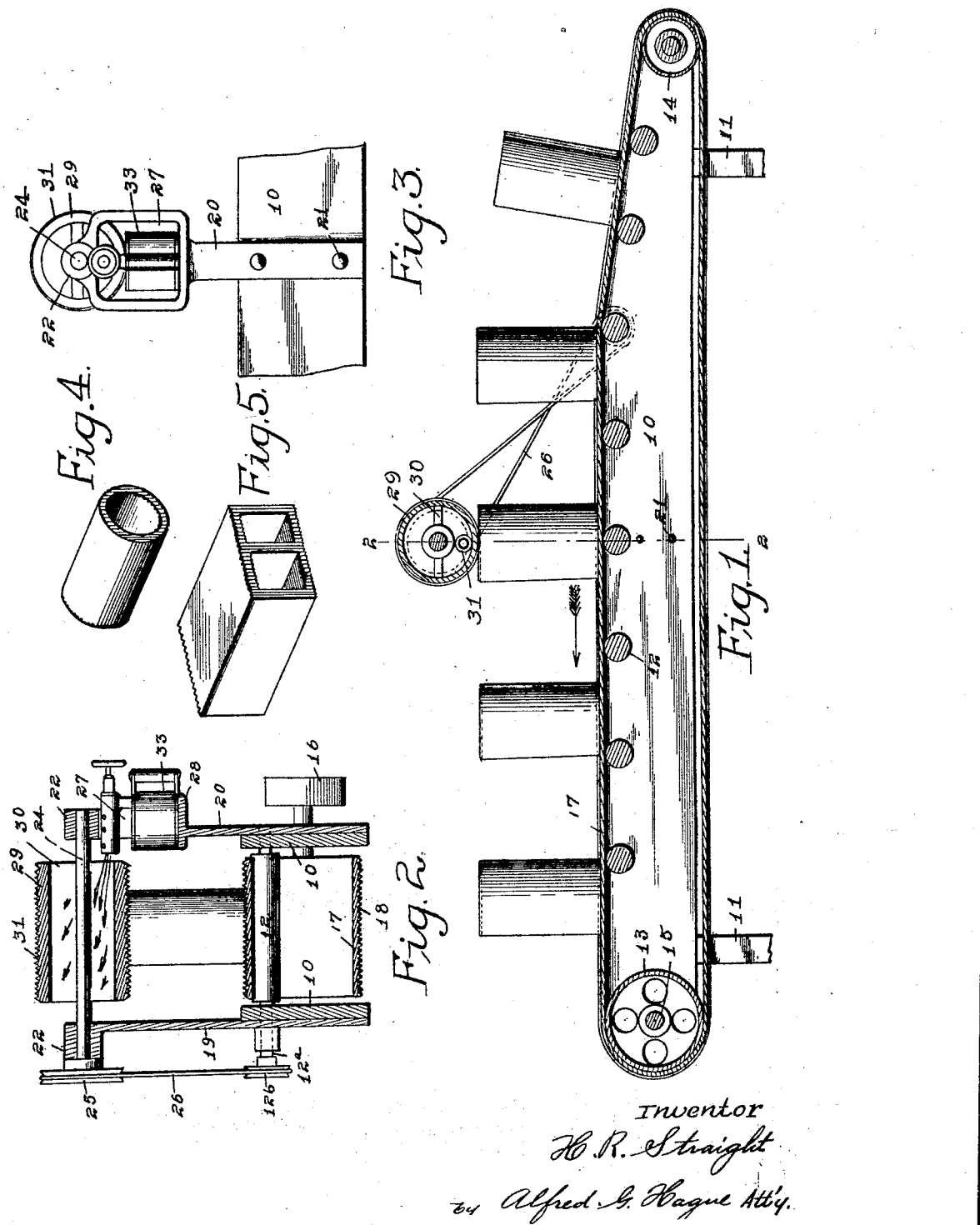
Inventor
H. R. Straight
by Alfred G. Hague Att'y.

UNITED STATES PATENT OFFICE.

HALVER RUFUS STRAIGHT, OF ADEL, IOWA.

MACHINE FOR CORRUGATING PLASTIC BLOCKS.

1,411,533.    Specification of Letters Patent.    Patented Apr. 4, 1922.

Application filed June 17, 1919. Serial No. 304,945.

*To all whom it may concern:*

Be it known that I, HALVER RUFUS STRAIGHT, a citizen of the United States, residing at Adel, in the county of Dallas, State of Iowa, have invented a Machine for Corrugating Plastic Blocks, of which the following is the specification.

This invention relates to improvements in clay working machines and particularly to those designed to corrugate the ends of tile and hollow building blocks. Heretofore the tile and building blocks have been cut with comparatively smooth ends. In drain tile it is desirable to corrugate or groove the ends to permit water to flow more freely between the adjacent ends when laid in the ditch. In building blocks it is desirable to corrugate or groove the ends to permit the mortar and cement to adhere more firmly, when the blocks are laid in a wall.

The object of my invention is to provide a machine of simple, durable and inexpensive construction adapted to automatically form grooves or corrugations in the ends of blocks formed of plastic material.

A further object is to provide in connection with a belt for conveying plastic blocks, means for automatically corrugating the upper and lower ends of the block carried thereby.

A still further object is to provide in a machine for corrugating plastic tile and blocks, employing a carrying belt in connection with a corrugating roller, means for moving the belt and the corrugating portion of the roller at the same speed.

A further object is to provide a conveyor belt to receive plastic tile or blocks from the cutter and adapted to corrugate or serrate the lower ends of the blocks or tile when placed in a vertical position thereon in connection with means for corrugating the upper ends of the blocks as they are advanced forward.

My invention consists in the construction, arrangement and combination of the various parts of the device whereby the objects contemplated are obtained as hereinafter more fully set forth, pointed out in my claims and illustrated in the accompanying drawings in which:

Fig. 1 is a central longitudinal sectional view of my corrugating machine showing the manner in which the blocks or tile are carried beneath the corrugating roller.

Fig. 2 is a transverse sectional view taken on the line 2—2 of Fig. 1.

Fig. 3 is a detailed view showing the segments of the supporting frame and the support for the corrugating roller in elevation.

Fig. 4 is a perspective view of the tile that has been corrugated by my machine showing the manner in which the corrugations or serrations of the block are applied to the ends.

Fig. 5 is a perspective view of the hollow building block showing the way in which the corrugations or serrations are applied to the ends thereof.

In the illustration of my invention disclosed in my accompanying drawings, I have used the reference numeral 10 to indicate a table in general having legs 11, and transverse rollers 12. One of the rollers 12 is provided with a laterally extending shaft $12^a$, having on its outer end a belt pulley $12^b$. I have provided at the end of the support, rollers 13 and 14. The roller 13 is provided with a laterally extending shaft having a belt wheel 16 on its outer end. The table 10 of the ordinary construction, is provided with a belt 17 designed to pass over the said rollers as clearly shown in the Fig. 1 of the drawings. This belt 17 is provided with longitudinal V shaped grooves 18 spaced slightly apart. The grooves may, however, be formed transversely or diagonally without materially departing from the results obtained or the spirit of my invention. The belt 17 is advanced forwardly in the direction of the arrow by means of a suitable belt on the pulley 16. Tables of this sort are generally placed with the right hand end, as shown in Fig. 1, adjacent to the delivery end of the cutting table. The plastic blocks are manually taken from the cutter and placed on the belt 17 in a vertical position. The speed of the belt 17 is comparatively faster than that of the cutter table. This causes the blocks to be spaced slightly apart and they are carried to a position where they may be loaded on suitable cars, after which they are carried to the drying rooms.

It will thus be seen that as the blocks or tile are placed on the belt 17 parallel grooves or serrations will be formed in the lower ends of the block or tile, due to the fact that the mixture of the material at this stage of the operation is such as will permit the material to enter the grooves by the weight of the block as it is placed in position. Grooves are formed on the upper end of the tile or blocks by the following mechanism:

Secured to each side of the support 10 by bolts 21, are upright members 19 and 20 having bearings 22 at their upper ends. A transverse shaft 24 is rotatably mounted in the bearings 22 and is provided at one end with a belt wheel 25 in line with the belt wheel 12$^a$ before described. A cross belt 26 is applied to the pulleys 12$^b$ and 25. The upright member 20 is provided with an opening 27, the lower edge of which is formed into a shelf 28. On the central portion of the shaft 24 is a drum 29 provided with spokes 30. The periphery of the drum is provided with a series of circumferential V shaped grooves 31, the lower side of said drum being spaced above the belt a distance slightly less than the vertical length of the blocks. These grooves may be formed longitudinally or diagonally without materially affecting the operation of the machine.

By the above construction, it will be seen that as the belt 17 is advanced and the pulley 16 is rotated, the plastic blocks on the forward end of the belt will be moved beneath the roller 29, said roller being rotated in the opposite direction from the belt 17 by means of the belt 26. Corrugations or serrations will be formed in the upper ends of the blocks similar to those formed in the lower ends. The diameters of the pulleys 12$^b$ and 25 are of such ratio as to cause the periphery of the drum 29 to travel at a speed substantially equal to that of the belt 17. This will prevent the blocks from being tilted as they pass under the drums and a round edge formed on one of the lower corners of the block.

To prevent material from sticking in the grooves 31, I have formed the said drum hollow and have provided a blow torch 33, which is placed on the shelf 28, the burner portion of the torch being of such elevation as to force heated air within the drum 29. This will cause the grooved portion to become hot. When the blocks are moved under the drum when it is thus heated, steam will be formed on account of the moisture within the block, which will prevent the material from sticking to the grooves.

Thus it will be seen that plastic blocks or tile may be automatically provided with corrugated or serrated ends with a very small amount of outlay as to cost and with no additional cost as to manual labor, the belt 17 and the table 10 being necessary in the operation of making hollow block or tile.

I claim:

1. In a device for corrugating plastic blocks, the combination of a hollow roller having a corrugated surface, and means for heating the corrugated portion of said roller.

2. A support, a conveyor having a series of grooves in its face, a transverse and rotatably mounted drum spaced from the conveyor and having a series of grooves in its periphery, means for driving the conveyor, and means for driving the nearer faces of said drum and conveyor in the same direction.

3. A support, a conveyor having a series of grooves in its face, a transverse and rotatably mounted drum spaced from the conveyor and having a series of grooves in its periphery, means for driving the conveyor, means for driving the nearer faces of the drum and conveyor in the same direction, and means for heating the drum for the purpose stated.

4. A support, a horizontally arranged belt conveyor having a series of closely arranged grooves in its face designed to carry vertically arranged blocks formed of plastic material, a transverse and rotatably mounted drum provided with a closely arranged series of grooves in its periphery, the said drum being spaced from the conveyor a distance substantially equal to the vertical length of said blocks, means for driving the conveyor, and means for driving the lower face of the periphery of the drum at a speed substantially equal to the speed of the conveyor and in the same direction.

5. A support, a conveyor belt provided with a longitudinally grooved face designed to receive vertically arranged plastic blocks, a transverse and rotatably mounted drum having a circumferentially grooved periphery spaced above said conveyor belt a distance substantially equal to the length of said blocks, and means for rotating the face of said drum in the same direction as the conveyor belt and at a peripheral speed substantially equal thereto.

6. A support, a conveyor belt provided with a grooved face designed to receive vertically arranged plastic blocks, a transverse and rotatably mounted drum having a grooved periphery spaced above said conveyor belt a distance substantially equal to the length of said blocks, means for rotating the lower face of said drum in the same direction as the top of the conveyor belt and at a peripheral speed substantially equal thereto, and means for heating the interior of said drum for the purpose stated.

7. In a device for corrugating plastic blocks, the combination of a member having a corrugated surface, means for applying the corrugated surface of said member to a plastic block, and means for heating the corrugated portion of said member, for the purposes stated.

HALVER RUFUS STRAIGHT.